No. 613,470.　　　　　　　　　　　　　　　Patented Nov. 1, 1898.
F. A. RICE.
CULTIVATOR.
(Application filed Sept. 2, 1897.)
(No Model.)
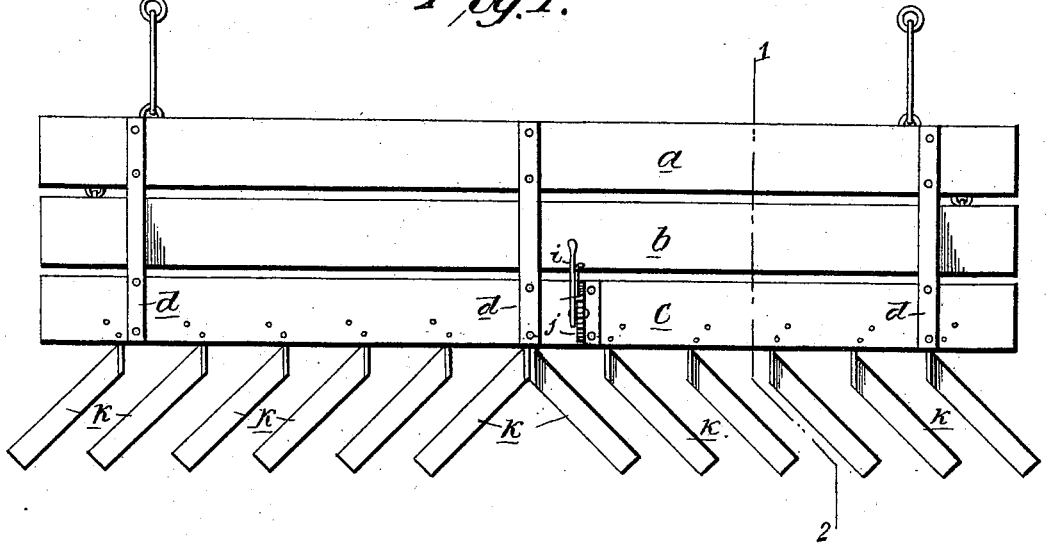
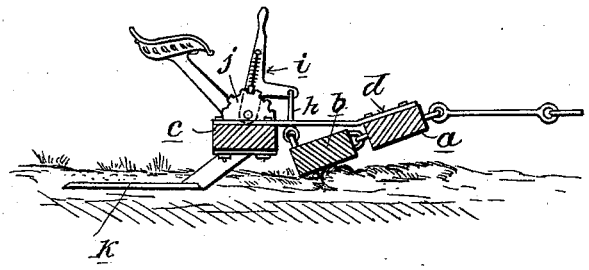
WITNESSES
J. Edw. Fowler
Chapman N. Fowler
INVENTOR
Frank A. Rice
by P. Walter Fowler
Asso— Attorney

UNITED STATES PATENT OFFICE.

FRANK A. RICE, OF EDNA, CALIFORNIA.

CULTIVATOR.

SPECIFICATION forming part of Letters Patent No. 613,470, dated November 1, 1898.

Application filed September 2, 1897. Serial No. 650,396. (No model.)

*To all whom it may concern:*

Be it known that I, FRANK A. RICE, a citizen of the United States, residing at Edna, in the county of San Luis Obispo and State of California, have invented certain new and useful Improvements in Cultivators, of which the following is a full, clear, and exact description.

My invention relates to certain improvements in cultivators; and it consists in the parts and the constructions and combinations of parts hereinafter described and claimed.

The objects of the invention are to simplify the construction of machines of this type, to furnish an effective weed-cutter that will sever all weeds at points below the surface of the ground, and thereby pulverize the surface without leaving furrows or trenches, to provide an improved clod-crusher for breaking and pulverizing clods, and to provide a simple form of leveler, the several objects being contained within the single organized structure shown and herein described.

Figure 1 represents a top plan view of a cultivator constructed according to my invention. Fig. 2 is a cross-sectional view on the line 1 2 of Fig. 1.

In constructing the frame or support of this machine I employ three parallel beams $a$ $b$ $c$, the two former being set at an incline with relation to the beam $c$. Firmly bolted to the beam $c$ are transverse straps or plates $d$, which extend from said beam $c$ over the middle beam $b$ without being attached to the latter and have their forward end bent upwardly and bolted to the inclined beam $a$, as shown in Fig. 2. Bolted to the under side of the beam $c$ are the blades or cutters $k$, which extend on edge rearwardly and downwardly from the beam and are then turned so that they lie horizontal and substantially parallel with the surface of the ground. These blades or cutters diverge from the center of the machine, as shown in Fig. 1, to maintain the draft central and to enable the machine to be moved across a field in a substantially straight line and without undue end movement. The blades or cutters have their horizontal upper and lower portions connected by a rearwardly and downwardly inclined shank which stands on edge, and said lower horizontal portion is designed to operate below the surface of the ground to cut the weeds and loosen up and pulverize the superposed soil without forming furrows or trenches. The depth of penetration of the blades is regulated by means of the intermediate beam $b$, which is loosely hinged at its front side to the forward beam $a$ and has its rear portion connected with a link $h$, the upper end of which is attached to the short arm of a fulcrumed bell-crank lever $i$, having any well-known form of pawl to engage a toothed segment $j$, secured to the beam $c$, said beams also forming the support for the ordinary driver's seat. By reason of this construction the beam $b$ may be adjusted so as to bear directly on the ground to regulate the depth of the blades in the soil and also to crush any clods or hard lumps with which it contacts, or said beam $b$ may be raised above the ground to give greater depth of penetration to the blades or cutters $k$. The beam $b$ also serves to level the ground when the lever $i$ is thrown forward, the weight of the machine holding the beam down, so that irregular places in the surface of the ground may be filled.

Having thus described my invention, what I claim as new, and desire to secure by Letters Patent, is—

An improved cultivator consisting of parallel beams two of which are inclined upwardly, one of said inclined beams hinged to its companion beam and provided with means whereby it may be raised and lowered with relation to the ground, straps or connecting-plates secured at opposite ends to the outside beams and devoid of connection with the intermediate beam, and blades or cutters having upper and lower horizontal portions and connecting portions set on edge, said lower horizontal portions extending in opposite directions from the central line of the machine.

FRANK A. RICE.

Witnesses:
L. H. KNER,
GEO. M. PAYNE.